United States Patent Office 3,363,689
Patented Jan. 16, 1968

3,363,689
WELL CEMENTING
Dwight K. Smith and Lloyd G. Carter, Duncan, Okla., assignors to Halliburton Company, Duncan, Okla., a corporation of Delaware
No Drawing. Filed Mar. 11, 1965, Ser. No. 439,091
17 Claims. (Cl. 166—29)

ABSTRACT OF THE DISCLOSURE

The patent describes a method of cementing a well by injecting into the well an aqueous cement slurry composition comprising cement and substantially water and basic unsoluble short-length reinforcing fibers. The patent also describes the primary cementing of wells utilizing these cement slurries.

---

This invention relates to a novel method for the cementing of oil wells.

In a cement-lined oil well, it is often necessary to perforate the cement sheath in order to allow the oil to flow into the well bore, where it can be removed to the surface. The perforation of the cement sheath is conventionally accomplished by jet or gun perforating. However, it has been found that perforating produces considerable damage to the cement sheath. The problem of cement damage from perforating is rather severe. Studies have shown that perforated areas in wells should be separated by 20 feet to 30 feet of cement for best results, otherwise communication between the perforated areas may occur. This communication diminishes the value of the perforations. In the cement compositions heretofore employed in the lining of wells, perforation has produced considerable damage to the cement sheath because of the shock and the vibration produced by the blast of the jet or gun perforator. The resulting shattering of the cement can cause undesirable communication between perforated areas. However, in accordance with the present invention there has now been developed a cementing process which minimizes fracturing and shattering, and allows cements to return to their original shape after perforation. The use of this process effectively reduces undesirable communications between perforated areas in the cement sheath of the well.

Accordingly, it is an object of this invention to provide a novel method of cementing oil wells.

Yet another object of this invention is the provision of a novel method of well cementing in which the resultant cement sheath possesses improved resistance to fracturing and shattering.

A further object of this invention is the provision of a well cement sheath which will return to its original shape after perforation.

These and other objects of this invention will become apparent to those skilled in the art from the more detailed description which follows.

The novel process of this invention comprising injecting into an oil well a cement slurry composition containing a small effective reinforcing amount of short length fibers and having the following general formulation.

| Ingredients: | Parts by weight |
|---|---|
| Portland cement | 100 |
| Short length fibers | 0.1 to 5.0 |
| Water | 31 to 80 |

The short length fibers employed in the foregoing formulations for well cementing may be glass or any of the synthetic fibers, such as nylon (polyamides), Orlon (polyacrylonitrile), Dacron (polyethylene terephthalate), other acrylic fibers such as Acrilan and Zefran, modified acrylics such as Dynel (vinyl chloride-acrylonitrile copolymer) and Verel, polyolefins (polyethylene and polypropylene), polyvinyl chloride, Saran (vinyl chloride-vinylidene chloride copolymer), Kodel (a polyester based on cyclohexane dimethanol), polyfluoroolefins including Teflon (polytetrafluoroethylene), vinyl acetate-vinyl chloride copolymer, Vinyon, and the like. The glass fibers may be uncoated or coated with various silane compositions familiar to those skilled in the art. Broadly stated, any of the natural or synthetic fibers can be used beneficially in our invention so long as they are substantially unaffected by the cement slurry, i.e., substantially insoluble in water or basic environment. Generally, the short length fibers have a length from about 0.25 to about 5 inches, and are from about 0.001 to about 0.200 inch in diameter.

Preferred fibers include Type 39 B semi-dull Orlon acrylic staple, 2.5 inches long, and Type 54 semi-dull Dacron polyester—6 denier ½ inch long, both manufactured by E. I. du Pont de Nemours & Co. Two types of nylon fibers obtainable from Du Pont and found to be particularly useful in this invention are Type 220, 3 denier, semi-dull ⅜ inch long, and Type 120, 15 denier bright, ¾ inch long. Preferred fiber glass fibers are Types 805 and 832 manufactured by Owens-Corning Fiberglass Corporation. Both of these materials contain a silane sizing and a coupling agent. The sizing on Type 805 is roughly 3.5% by weight of the fibers, and on Type 832, 1.58% by weight.

Various other additives may be optionally employed in the practice of this invention. For example, bentonite may be added as a gelling agent in an amount from about 1% to about 25%, based on the total weight of cement slurry.

It has been found that various blending procedures may be employed in the preparation of the cement slurry for use in this invention. For example, the nylon fibers may be conveniently blended using a standard pneumatic or screw-type bulk plant blender. The cement and the nylon fibers may be dry blended in this device and then mixed into a slurry using a rotary jet mixer.

The following is the general procedure for blending the slurry used in the method of this invention. Into a standard screw-type blender was placed the neat cement. The short length fibers were added through a hatch on the top of the blender. After placement of the fibers and cement in the blender, the materials were blended for 10 minutes. The fiber-cement mixture was removed from the blender to a pneumatic transport. The material was dispaced from the blender using both vertical and overhead horizontal screws. After transferring all of the cement from the blender that was possible, additional cement was added to the blender to clean it. This cement was discharged to a surge tank on the transport. The cement in the surge tank was for use in bringing the slurry up to the required weight of cement. The mixing of the cement was then continued with the cement being unloaded from the surge tank on the pneumatic transport.

In cementing a well using the novel slurry of this invention, the string of pipe is first placed in the bore hole. Then the cement slurry, containing any conventional additives is pumped down the pipe and out the end of the pipe, or through perforations in the pipe. The slurry is then forced up the annular space between the string of pipe and the walls of the drilled borehole. The cement is then allowed to set.

Compressive strength tests on the cured cement were made according to API RP 10B, recommended practice for testing oil well cements and cement additives.

Jet perforating tests were conducted by filling the annular space between a piece of tubing inserted in the center of a piece of casing with various cementing compositions.

The targets were allowed to cure under water at ambient temperature before being perforated. The targets used to conduct these tests were 3 ft. length sections of 2⅞ inch, 6.4 lbs. per ft., N-80 tubing, and cemented in a 7 inch, 29 lbs. per ft., N-80 casing. The various cement compositions were perforated with a single shot, using either a 2⅛ inch link jet or a 1¹¹⁄₁₆ inch link jet. All targets were perforated by submerging them under 2 ft. of water using a single shot.

The following examples illustrate the invention:

EXAMPLE 1

Compressive strength and jet perforating tests were performed on cement containing 0, 0.5 and 1.0% by weight of cement of 3 denier and 15 denier DuPont nylon. The samples were cured at 100° F. for 24 hours under water.

TABLE 1.—COMPRESSIVE STRENGTH

Curing Temperature, 100° F.
Curing Time, 24 Hours
Cement, API Class A Cement.

| | Type of Nylon | | | |
|---|---|---|---|---|
| | 3 Denier | | 15 Denier | |
| Pounds per Sack | 0 | 0.5 | 1.0 | 0.5 | 1.0 |
| Percent Bentonite Gel: | | | | | |
| 0 | 2,890 | 2,510 | 2,385 | 2,690 | 2,510 |
| 12 | 315 | 232 | 253 | 237 | 242 |

TABLE 2.—DESCRIPTION OF PERFORATION TESTS

View of perforation by 1¹¹⁄₁₆ inch link jet with 7" casing removed.

(1) API Class A Cement with 12% Bentonite and 1.0 pounds of 15 denier nylon per sack of cement. Neat perforation—No shattering or cracks around the perforation.

(2) API Class A Cement with 12% Bentonite and 0.5 pound of 15 denier nylon per sack of cement. Neat perforation—no shattering or cracks around the perforation.

EXAMPLE 2

Following the procedures of Example 1, various cement compositions were prepared and poured containing Dacron, Orlon and fiberglass in lieu of nylon.

Compressive strength and perforating tests were made in cement containing 0, 0.5 and 1.0% Dacron, Orlon and fiberglass fibers by weight. These samples were cured at 100° F. for 24 hours under water.

TABLE 3.—COMPRESSIVE STRENGTH

Curing Time, 24 Hours
Curing Temperature, 100° F.
Cement, API Class A Cement

| Fiber | | Bentonite | |
|---|---|---|---|
| Type | Percent | 0% | 12% |
| None | 0 | 2,705 | 315 |
| Dacron-54 | 0.5 | 2,525 | 290 |
| Do | 1.0 | 2,600 | 310 |
| Orlon-39B | 0.5 | 1,998 | 280 |
| Do | 1.0 | 1,780 | 225 |
| Fiber Glass-805 | 1.0 | 2,885 | |
| Fiber Glass-832 | 1.0 | 2,900 | |

TABLE 4.—DESCRIPTION OF PERFORATION TESTS

View of perforation formed by 1¹¹⁄₁₆ inch link jet with 7" casing removed:

(1) API Class A Cement with 12% gel—No Fibers Cement badly shattered and cracked in vicinity of perforation.

(2) API Class A Cement with 12% gel and 0.5 pound of Dacron per sack of cement—Neat hole, no extensive cracking or shattering of cement.

(3) API Class A Cement with 12% gel and 1.0 pound of Dacron per sack of cement—Neat hole, no extensive cracking or shattering of cement.

(4) API Class A Cement with 12% gel and 0.5 pound of Orlon per sack of cement—Neat hole, no extensive cracking or shattering of cement.

(5) API Class A Cement with 12% gel and 1.0 pound of Orlon per sack of cement—Neat hole, no extensive cracking or shattering of cement.

It will be understood that many other ingredients may be present in the cement composition employed in the method of this invention. For example, in certain applications it may be desirable to use materials such as cement accelerators, pozzolans, silica flour, diatomaceous earth, cement retarders, fluid loss additives, friction reducing agents and the like. These ingredients are used in conventional amounts. For example, the pozzolans, silica flour and diatomaceous earth are used in amounts up to 25% by weight of the cement, or more, with pozzolans being used up to about 75%, silica flour being used up to about 60% and diatomaceous earth being used to about 50%. Accordingly, since many variations are possible according to the practice of this invention, it is intended that the invention be limited only by the lawful scope of the appended claims.

We claim:

1. The method of cementing an impermeable sheath in a well which minimizes fracturing and shattering and allows the cement sheath to return to its original shape after perforation, which comprises the steps of injecting into the well an aqueous cement slurry composition comprising cement and a small effective reinforcing amount of short length fibers, said fibers being substantially unaffected by cement slurry and substantially insoluble in water and basic environments, permitting the cement to set in the well to form a substantially impermeable sheath, and perforating a portion of said sheath.

2. The method of claim 1 wherein the short length fibers are present in an amount from about 0.1% to about 5% by weight based on the weight of the cement.

3. The method of claim 1 wherein the cement slurry additionally contains bentonite in an amount up to about 25% by weight of the cement.

4. The method of claim 1 wherein the short length fibers have a length from about 0.25 to about 5 inches and a diameter from about 0.001 to about 0.200 inch.

5. The method of claim 1 wherein the cement slurry contains from about 0.1% to about 5% by weight of short length fibers having a length from about 0.25 to about 5.0 inches and a diameter from about 0.001 to about 0.200 inch, and from about 31% to about 80% by weight of water, all percentages being based on the weight of the cement.

6. The method of claim 1 wherein the short length fibers are nylon.

7. The method of claim 1 wherein the short length fibers are Orlon.

8. The method of claim 1 wherein the short length fibers are Dacron.

9. The method of claim 1 wherein the short length fibers are fiberglass.

10. The method of claim 1 wherein the short length fibers are polypropylene.

11. The method of claim 1 wherein the cement slurry additionally contains a pozzolanic material in an amount up to about 75% by weight of the cement.

12. The method of claim 1 wherein the cement slurry additionally contains silica flour in an amount up to about 60% by weight of the cement.

13. The method of claim 1 wherein the cement slurry additionally contains diatomaceous earth in an amount up to about 50% by weight of the cement.

14. The method of cementing a subterranean well bore and perforating said cemented well which minimizes fracturing and shattering and allows the cement to return to its original shape after perforation which comprises the steps of injecting into said well an aqueous cement slurry composition comprising cement and a small effective reinforcing amount of short-length fibers, allowing said slurry to set to form a substantially impermeable sheath, and perforating said cement by a perforating process.

15. The method of cementing a well to form an impermeable sheath which minimizes fracturing and shattering and allows the cement sheath to return to its original shape after perforation which comprises the steps of:
 (a) placing a string of pipe in a bore hole;
 (b) pumping an aqueous cement slurry down the pipe and out the lower end of the pipe, said aqueous cement slurry composition being comprised of cement and a small effective reinforcing amount of short length fibers which are substantially unaffected by the cement slurry and substantially insoluble in water and basic environments;
 (c) forcing said slurry up the annular space between the string of pipe and the walls of the bore hole;
 (d) allowing said cement slurry to set in said annular chamber to form a substantially impermeable sheath; and
 (e) perforating a portion of said sheath.

16. The method of claim 15 wherein the cement slurry additionally contains bentonite in an amount up to about 25% by weight of the cement.

17. The method of claim 15 wherein said cement slurry contains short length fibers having a length from about 0.25 to about 5.0 inches, and a diameter from about 0.001 to 0.200 inch.

References Cited

UNITED STATES PATENTS

| | | | |
|---|---|---|---|
| 2,880,096 | 3/1959 | Hurley | 166—31 |
| 2,985,239 | 5/1961 | Shell | 166—31 |
| 3,044,547 | 7/1962 | Jarboe | 166—29 X |

CHARLES E. O'CONNELL, *Primary Examiner.*

NILE C. BYERS, *Examiner.*